United States Patent [19]

Hatfield

[11] Patent Number: 4,976,224
[45] Date of Patent: Dec. 11, 1990

[54] DOUBLE HINGED CATTLE STANCHION APPARATUS

[76] Inventor: John Hatfield, 1823 Shoestring Rd., Gooding, Id. 83330

[21] Appl. No.: 514,759

[22] Filed: Apr. 26, 1990

[51] Int. Cl.$^5$ .............................................. A01K 1/06
[52] U.S. Cl. ...................................... 119/148; 119/149
[58] Field of Search ..................... 119/143, 141.1, 904, 119/149

[56] References Cited

U.S. PATENT DOCUMENTS

| Re.32,728 | 8/1988 | Albers, Sr. | 119/148 |
| 1,631,337 | 6/1927 | Quade et al. | 119/148 |
| 1,790,577 | 1/1931 | Ferris | 119/148 |
| 1,888,608 | 11/1932 | Rassmann | 119/148 |
| 4,037,566 | 7/1977 | Albers | 119/148 |
| 4,051,813 | 10/1977 | Albers | 119/148 |
| 4,055,149 | 10/1977 | Haiges | 119/147 |
| 4,185,592 | 1/1980 | Albers, Sr. | 119/148 |
| 4,377,131 | 3/1983 | Vandenberg et al. | 119/148 |
| 4,457,265 | 7/1984 | Anderson | 119/148 |
| 4,476,815 | 10/1984 | Albers, Sr. | 119/148 |
| 4,495,897 | 1/1985 | Albers, Sr. | 119/148 |
| 4,867,105 | 9/1989 | Hatfield | 119/148 |

FOREIGN PATENT DOCUMENTS

| 2446026 | 4/1976 | Fed. Rep. of Germany | 119/148 |
| 2632057 | 1/1978 | Fed. Rep. of Germany | 119/148 |
| 2818513 | 11/1979 | Fed. Rep. of Germany | 119/147 R |
| 2242929 | 5/1975 | France | 119/148 |
| 2332703 | 7/1977 | France | 119/148 |
| 646960 | 2/1979 | U.S.S.R. | 119/147 R |

Primary Examiner—Paul J. Hirsch
Attorney, Agent, or Firm—Frank J. Dykas; Craig M. Korfanta

[57] ABSTRACT

A double hinged cattle stanchion (10) is disclosed and includes a pair of release stanchions, a "J" shaped fulcrum stanchion (15) and a release stanchion (14), both of which are pivotally attached between a pair of fixed stanchions (13). Fixed stanchions (13) are attached in upright pairs between a horizontally extending top rail (11) and a horizontally extending bottom rail (12). Fulcrum stanchion (15) includes a main elongated portion and a perpendicularly depending leg member. A fulcrum offset member (16) is perpendicularly attached at a midpoint along the main elongated portion and includes a fulcrum bracket (17) at its extending end. Fulcrum bracket (17) provides a pivotal attachment point for release stanchion (14) via a standard pivot bolt (18). The extending end of the depending leg portion of fulcrum stanchion (15) is pivotally attached to a base bracket (20) located between a pair of fixed stanchions (13) on bottom rail member (12). First and second stanchion heads (28) and (29) are attached to the upper ends of fulcrum stanchion (15) and release stanchion (14) respectively. Each stanchion head includes a pivotally elongated latch member being disposed to engage actuator rod (21) which is rotatably and axially attached along top rail (11).

3 Claims, 6 Drawing Sheets

DOUBLE HINGED CATTLE STANCHION APPARATUS

BACKGROUND OF THE INVENTION

1. Technical Field

The instant invention relates to a cattle stanchion apparatus and more particularly to a double hinged cattle stanchion apparatus for a modified single release cattle stanchion.

2. Background Art

The current state of the art in cattle stanchions is best exemplified by ALBERS, SR., U.S. Pat. Nos. 4,476,815, and Re. 32,728 and by my U.S. Pat. No. 4,867,105. The first ALBERS patent '815 teaches a single release cattle stanchion while U.S. Pat. No. Re. 32,728 teaches a double release cattle stanchion. Both the single and double release stanchions are controlled by a rotatable and axially movable positioner, or actuator rod, which has a series of couplers protruding radially outward from its surface for engaging the latches located on the top end of the individual release stanchions.

Because the latches of both the single and double release stanchions of ALBERS are exposed on their top side, they present a serious health hazard to the operator. During the course of veterinary examinations and animal lock-up, there are instances wherein an individual cow must be released from the stanchion without releasing any of the other cattle. The operator must somehow flip the latch up over the coupler allowing the release stanchion to fall to an open position. Very strong pressures can be exerted on the release stanchion by the cow which makes releasing the stanchion a precarious and dangerous operation. In fact, most operators opt to use a metal rod of some sort to flip the latch over the coupler. The problem is that there is no safe place to grab the release stanchion to counteract the pressure exerted by cow and subsequently flip the latch over the coupler. Solving this problem was the central focus of my U.S. Pat. No. 4,867,705.

An additional problem exists with all the previously mentioned cattle stanchions. Specifically, some young and timid cows are reluctant to engage the stanchion because the head openings are relatively small. Obviously, this can be a big problem since young cows especially need sufficient nutrients and medical attention, both of which are administered while engaged in the stanchion.

VOGT, German Patent No. 28 18 513 shows what appears to be a three position modified single release stanchion. In this modified single release stanchion, two single release stanchions are used for each feeding stall. Each single release stanchion has only one single release latch, hence the name single release. Vogt uses two positioner bars, an upper bar and a lower bar, to actuate the two stanchions, i.e. a release stanchion and a fulcrum stanchion. The lower positioner bar controls the release stanchion while the upper positioner bar controls the fulcrum stanchion. Using the two positioner bars, an operator can set the stanchions in a closed or locked out position, a self locking position or in an open or neutral position as desired. Unfortunately, this apparatus does not provide an escape for a downed animal. Also, the use of two positioner bars unnecessarily complicates the device.

What is needed is a cattle stanchion which includes a downed animal position whereby a downed animal can be safely and easily released and a cattle stanchion which encourages young or timid cows to engage themselves in the stanchion where they can eat and get the attention they need.

DISCLOSURE OF INVENTION

These, and other objects, are accomplished by a new design of cattle stanchion which includes a pair of release stanchions, a "J" shaped fulcrum stanchion and a release stanchion, both of which are pivotally attached between a pair of fixed stanchions. The fixed stanchions are normally attached in upright pairs between a horizontally extending top rail and a horizontally extending bottom rail. The "J" shaped fulcrum stanchion includes a main elongated portion and a perpendicularly depending leg member. A fulcrum offset member is perpendicularly attached at a midpoint along the main elongated portion and extends generally parallel to the depending leg portion. A fulcrum bracket is attached to the extending end of the fulcrum member and provides a pivotal attachment point for the release stanchion. The extending end of the depending leg portion is pivotally attached to a base bracket located between a pair of fixed stanchions on the bottom rail member. A pair of stanchion heads are each attached to one of the upper ends of the fulcrum stanchion and the release stanchion. Each stanchion head includes a pivotally attached elongated latch member being disposed to engage an actuator rod, generally attached along the top rail member.

The elongated latch member attached to the top of the fulcrum stanchion for releasing the same includes a trigger release member extending therefrom to provide a convenient hold for releasing the latch member from the actuator rod to pivot the fulcrum stanchion into the down cow position. The trigger release member is conveniently shaped in an inverted J form to provide a convenient purchase for a finger or fingers of the user. The trigger member provides a means for the operator to release a downed animal without having to physically touch the elongated latch, thus keeping the operator's fingers and hands free of any danger.

This particular configuration provides a cattle stanchion having at least five distinct positions which include an open timid cow position, a standard self locking position, a closed position, a downed cow release position and a neutral position.

BRIEF DESCRIPTION OF THE DRAWINGS

FIG. 2 B is an elevation view of a catch tang;

BEST MODE FOR CARRYING OUT INVENTION

Figure 1:
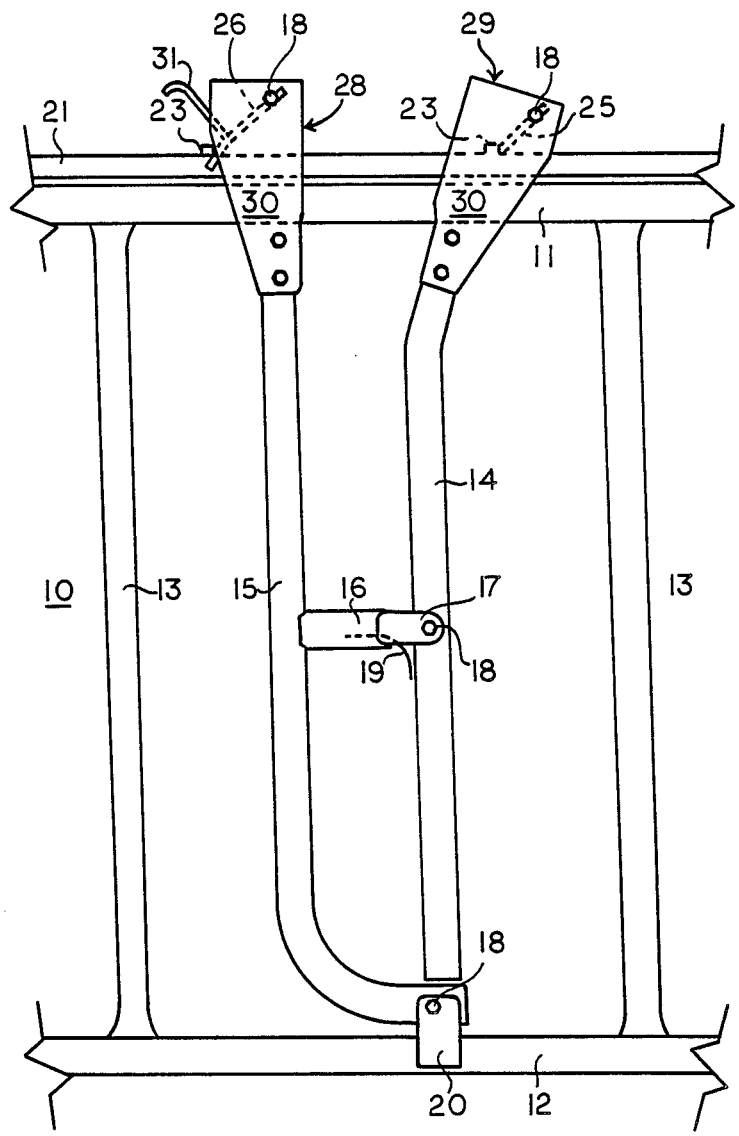
FIG. 1 is a front elevation view of a single feeding stall of the double hinged cattle stanchion apparatus in a closed position.

Referring now to FIGS. 1-6, a double hinged cattle stanchion 10 is shown which includes a main frame constructed from top rail 11, bottom rail 12 and fixed stanchions 13. A plurality of release stanchions 14, each having an angularly offset upper end, are pivotally attached to fulcrum stanchions 15 at fulcrum brackets 17 using pivot bolts 18. Each fulcrum bracket 17 is attached to the end of a fulcrum offset member 16 which extends radially outward from the main elongated portion of each fulcrum stanchion 15, in a direction generally parallel to top and bottom rails 11 and 12. Similarly, each fulcrum stanchion 15 has a "J" shaped lower end or depending leg portion which extends out parallel to fulcrum member 16. The depending leg portion is pivotally attached to base bracket 20, again using suitable pivot bolt 18. The "J" shape of fulcrum stanchion 15 allows it to pivot from its vertical upright position, shown in FIG. 1 through a counter-clockwise rotation of approximately 10 to 15 degrees, with respect to fixed stanchions 13.

Figure 3:
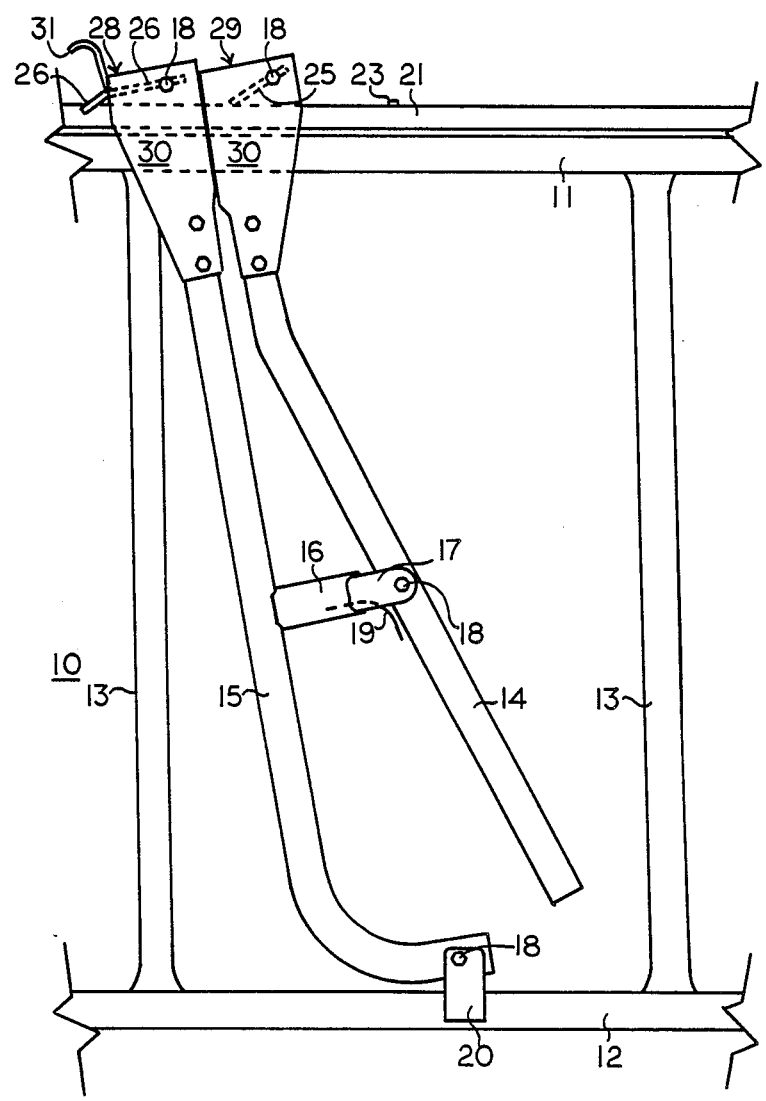
FIG. 3 is an elevation view of a double hinged cattle stanchion in an open timid cow position.

The pivotal attachment of release stanchions 14 to fulcrum offset numbers 16, allows release stanchions 14 to pivot about their pivot bolt attachment 18 through an approximate angle of 10 to 15 degrees, with respect to the attached fulcrum stanchion 15, in either a clockwise or a counter-clockwise direction. With release stanchion 14 at its maximum counter-clockwise displacement about its pivot bolt 18 and fulcrum stanchion 15 at its maximum counter-clockwise displacement with respect to fixed stanchions 13, release stanchion 14 sees a relative angular displacement in a clockwise direction of approximately 30 degrees, with respect to fixed stanchions 13. This is best shown in FIG. 3 and represents the fully opened timid cow position.

Release stanchion actuator rod 21 is disposed parallel to top rail 11 and is slidably and axially movable thereon via rod guides 22. A plurality of couplers 23 are radially attached to stanchion actuator rod 21 for engagement with a coupler engagement means located on each fulcrum stanchion 15 and each release stanchion 14. Couplers 23 are disposed on actuator rod 21 such that axial rotation of actuator rod 21 provides for different modes of operation i.e. automatic lock, manual lock, or no lock modes and five different positions, i.e. a fully open timid cow position, a self locking position, a closed position, a downed cow release position and a neutral position.

Fulcrum offset member 16 are here manufactured from a hollow metal tubing, namely galvanized pipe. The extending end of each fulcrum offset number 16 is left open and has fulcrum bracket 17 diametrically attached at opposing sides. A pivot biasing spring 19 is diametrically attached to the inside of the open end and extends outward therefrom. Pivot biasing springs 19 are here a resilient metal leaf type spring and act to bias release stanchions 14 toward an open position.

Figure 2A:
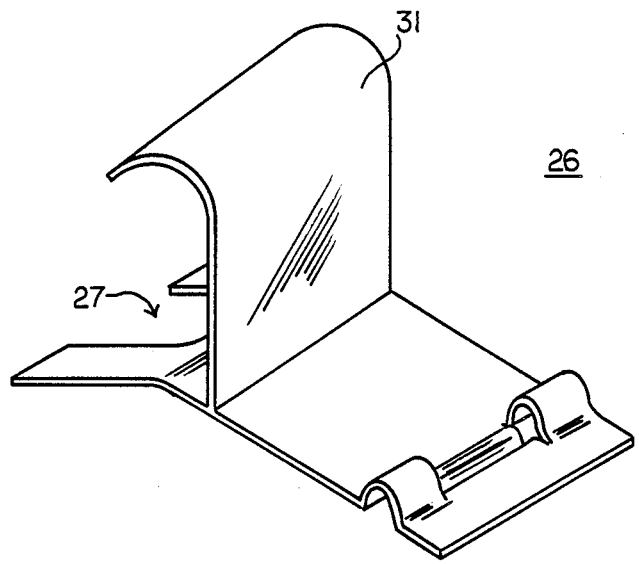
FIG. 2 A is an elevation view of a stop dog.
Figure 2B:
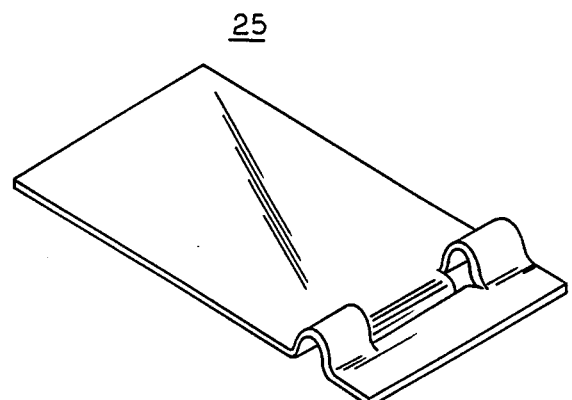

A first stanchion head 28 is attached to the upper end of each fulcrum stanchion 15. First stanchion head 28 has a safety housing 30 which extends from one side of the housing up and over top rail 11 and actuator rod 21 and extends back down to the other side of fulcrum stanchion 15. A stop dog 26 is pivotally attached between the opposing side walls of safety housing 30 and is disposed to engage coupler 23. Stop dog 26 includes an angularly offset lower end having a rod cutout 27 therein and an inverted J-shaped trigger release member 31 extending therefrom, as are shown in FIG. 2 A. Rod cutout 27 insures that stop dog 26 will remain in engagement with coupler 23 throughout a 180 degree radial displacement of actuator rod 21. Trigger release member 31 is attached to stop dog 26 and disposed to be conveniently positioned such that an operator can disengage stop dog 26 from coupler 23 without actually having to touch stop dog 26. This permits the user to position stanchion 10 in the downed animal release position without endangering his or her hand or fingers.

Similarly, a second stanchion head 29, including an identical safety housing 30, is attached to the upper angular offset end of each release stanchion 14. A catch tang 25 is pivotally attached between the opposing walls of second stanchion head 29 and disposed to engage one of the couplers shown at 23. Catch tang 25, best shown in FIG. 2 B, is configured to engage coupler 23 when actuator rod 21 is in its upright angular disposition. Actuator rod 21 can be axially slid without engaging catch tang 25 by rotating rod 21 through a clockwise or counter-clockwise angular displacement of 90 degrees. This feature allows simultaneous operation of a plurality of release stanchions 14 to lock or unlock the individual feeding stalls.

A particularly useful feature of the instant invention is the ability to adjust the head size opening by altering the throw of actuator rod 21. By allowing actuator rod 21 to move from left to right passed the normal stopping position shown in FIG. 1, release stanchion 14 and fulcrum stanchion 15 are pivoted clockwise about base bracket 20. This positions fulcrum bracket 17 and couplers 23 further to the right than that shown in FIG. 1, the net effect being to decrease the width of the head opening, i.e., the distance between release stanchion 14 and adjacent fixed stanchion 13. This is particularly desireable in that young cows heads are normally too small to be securely held by the standard stanchion. If desired, adjustable position stops can be affixed to the underside of top rail 11 to engage release stanchion 14. In this manner, a single set of stanchions can be adjusted to "grow" with the herd. Previously, a set of smaller stanchons was required for the younger cattle.

Figure 4:
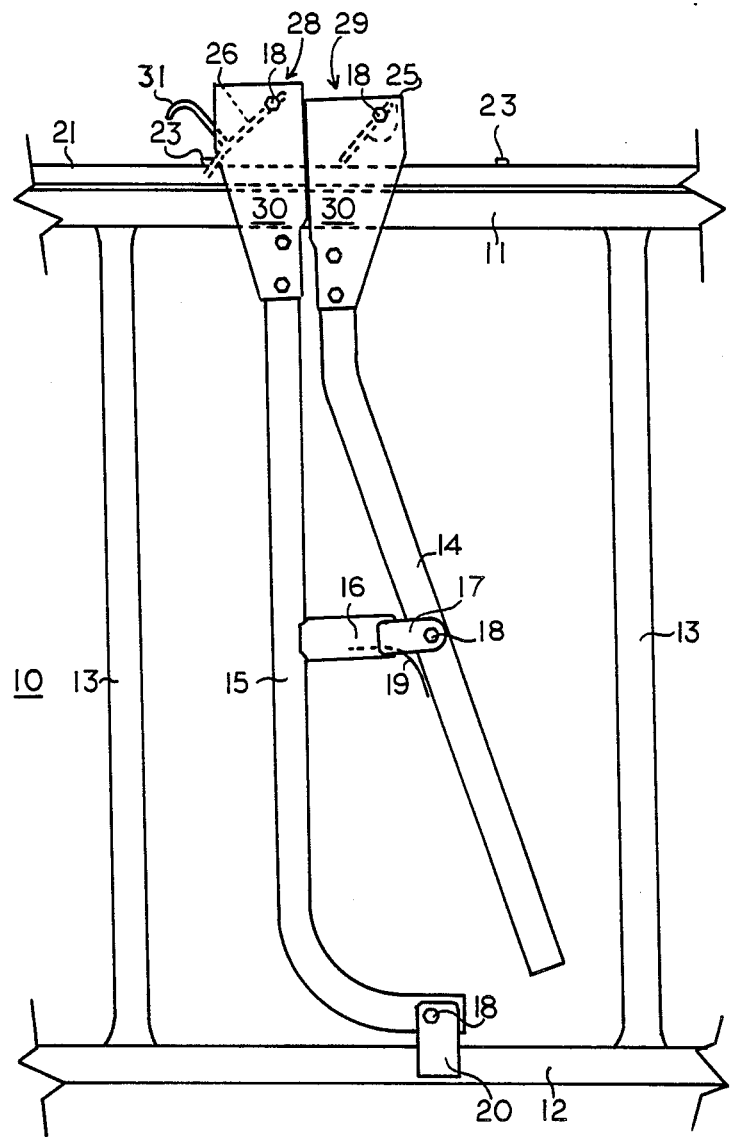
FIG. 4 is a front elevation view of the double hinged cattle stanchion apparatus in a normal self locking position.
Figure 5:
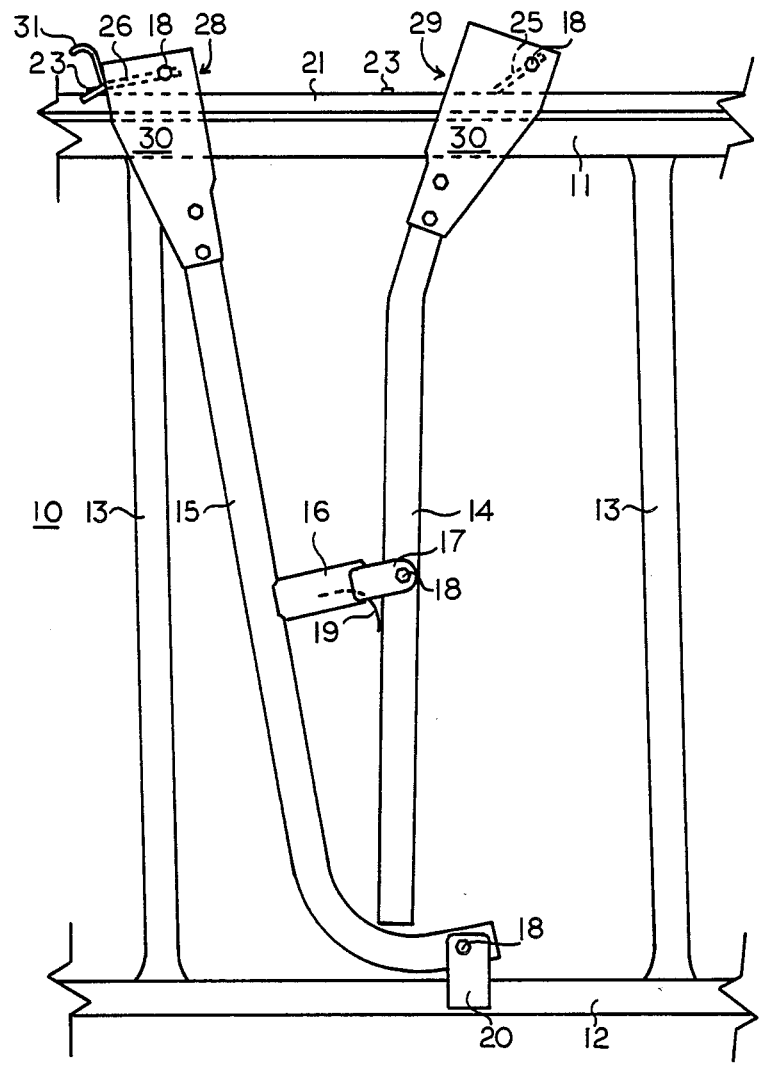
FIG. 5 is a front elevation view of the double hinged cattle stanchion in a downed cow release position.
Figure 6:
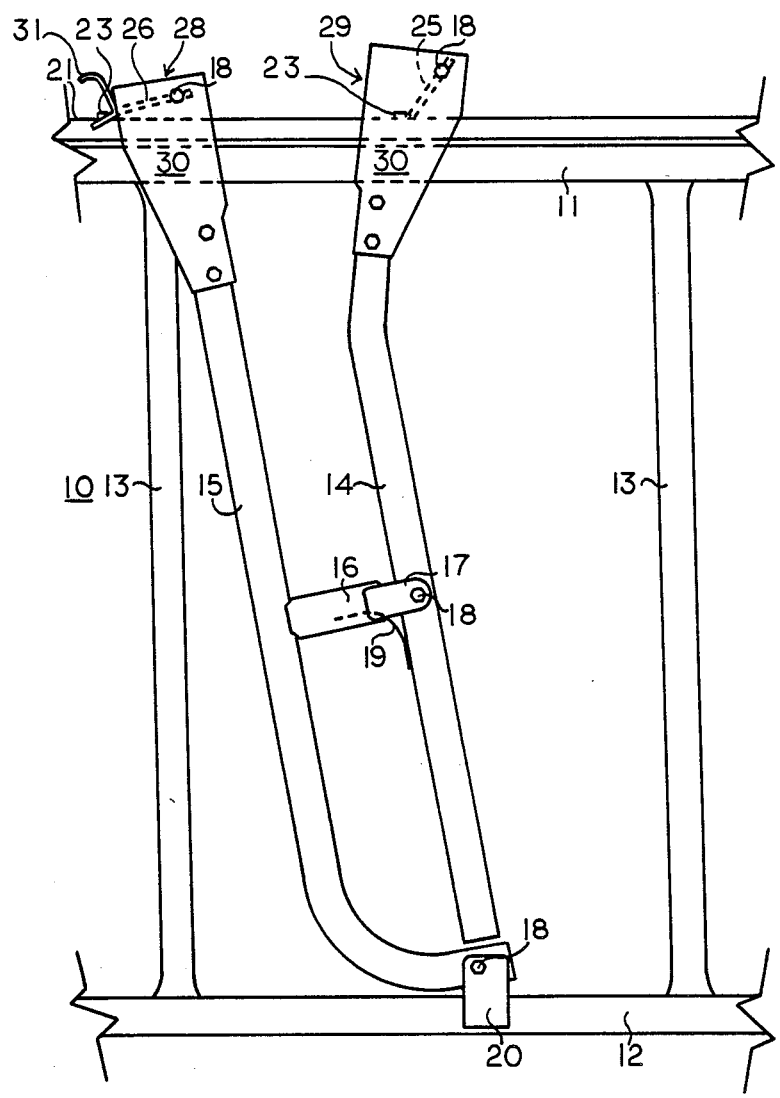
FIG. 6 is a front elevation view of the double hinged cattle stanchion in a neutral position.

In use, a stanchion is initially positioned in one of four positions, the full open timid cow position of FIG. 3, a self locking position of FIG. 4, the neutral position of FIG. 6 or a closed position of FIG. 1. For normal day to day feeding, the stanchion is either positioned in the neutral position of FIG. 6 or the full open timid cow position of FIG. 3. To position the stanchion in the neutral position of FIG. 6, the operator simply retracts actuator rod 21 to a point where fulcrum stanchion 15 is positioned at its maximum counter-clockwise angular displacement. The fully opened timid cow configuration of FIG. 3 can then be obtained by simply rotating actuator rod 21 of 90 degrees clockwise or counter-clockwise, thereby allowing release stanchion 14 to fall into its maximum counter-clockwise angular displacement about fulcrum bracket 17. From this position, the self locking configuration of FIG. 4 can be accomplished by rotating actuator rod 21 to its upright position and sliding actuator rod forward, toward right hand side of the page as shown in the figures, to a point where fulcrum stanchion 15 is generally vertical. A cow lowering its head and engaging the lower end of release stanchion 14 will cause second stanchion head 29 to slide along actuator rod 21 until the catch tang 25 slides up and over coupler 23 and release stanchion 14 is substantially vertical. At this point, the stanchion is configured in the closed configuration as is shown in FIG. 1.

In the event of a downed animal, the operator would grab a hold of the second stanchion head 29 and pivot stop dog 26 in a clockwise direction to allow fulcrum stanchion 15 to fall into its maximum counter-clockwise angular displacement. By doing so, the fulcrum point of release stanchion 14 is translated to the left. Release stanchion 14 then pivots in a clockwise direction about fulcrum bracket 17. The net effect is to not only widen the bottom portion of the head opening but to additionally move release stanchion 14 away from its adjacent fixed stanchion 13, thereby increasing the overall width of the head opening.

While there is shown and described the present preferred embodiment of the invention, it is to be distinctly understood that this invention is not limited thereto but may be variously embodied to practice within the scope of the following claims.

I claim:

1. In a cattle stanchion apparatus having a top rail, a bottom rail, a plurality of fixed stanchions being attached to and between the top rail and the bottom rail and an actuator rod being rotatably and slidably attached along the top rail, the improvement which comprises:
   a plurality of pairs of first and second release stanchion couplers being attached in spaced relation one to the other along the length of the actuator bar and positioned to locate release stanchions and fulcrum stanchions in an open timid cow position, a standard self locking position, a closed position, a downed cow release position or a neutral position;
   a fulcrum stanchion having a "J" shaped lower end being pivotally attached at its lower end to the bottom rail between two adjacent fixed stanchions;
   a release stanchion being pivotally attached approximately at its center point to an approximate center point on said fulcrum stanchion;
   a pair of stanchion heads, one being attached to an upper end of said fulcrum stanchion and one being attached to said release stanchion, each of said stanchion heads including a safety release housing having a pair of vertical opposing side walls, said housing being disposed to receive and encompass the top rail and the actuator rod;
   a catch tang being pivotally attached between the opposing side walls of the stanchion head attached to said release stanchion and disposed to engage a first coupler on the actuator bar thereby preventing the release stanchion from pivoting into an open position when the actuator rod is in a closed position; and
   a stop dog, including a trigger release member, being pivotally attached at an upper end between the opposing side walls of the stanchion head attached to said fulcrum stanchion and having a lower end including an actuator rod cutout therein being engaged with said actuator rod and a second release stanchion coupler thereby preventing said fulcrum stanchion from pivoting into an open position when the actuator rod is in the closed position.

2. The cattle stanchion apparatus of claim 1 further comprising a spring biasing means being operably connected between said release stanchion and said fulcrum stanchion for biasing said release stanchion toward an open position.

3. In a cattle stanchion apparatus having a top rail, a bottom rail, a plurality of fixed stanchions being attached to and between the top rail and the bottom rail and an actuator being rotatably and slidably attached along the top rail, the improvement which comprises:
   a plurality of pairs of first and second release stanchion couplers being attached in spaced relation one to the other along the length of the actuator bar and positioned to locate release stanchions and fulcrum stanchions in an open timid cow position, a standard self locking position, a closed position, a downed cow release position or a neutral position;
   a fulcrum stanchion having a main elongated portion and a "J" shaped lower end being pivotally attached at its lower end to the bottom rail between two adjacent fixed stanchions;
   a fulcrum member being radially attached to approximately at a mid point on the main elongated portion of said fulcrum stanchion member;
   a release stanchion being pivotally attached approximately at its center point to said fulcrum member;
   spring biasing means being operably connected between said release stanchion and said fulcrum offset member or biasing said release stanchion toward an open position;
   a pair of stanchion heads, one being attached to an upper end of said fulcrum stanchion and one being attached to said release stanchion, each of said stanchion heads including a safety release housing having a pair of vertical opposing side walls, said housing being disposed to receive and encompass the top rail and the actuator rod;
   a catch tang being pivotally attached between the opposing side walls of the stanchion head attached to said release stanchion and disposed to engage a first coupler on the actuator bar thereby preventing the release stanchion from pivoting into an open position when the actuator rod is in a closed position; and
   a stop dog being pivotally attached at an upper end between the opposing side walls of the stanchion head attached to said fulcrum stanchion and having a lower end including an actuator rod cutout therein being engaged with said actuator rod and a second release stanchion coupler thereby preventing said fulcrum stanchion from pivoting into an open position when the actuator rod is in the closed position.

* * * * *